(12) United States Patent
Strong et al.

(10) Patent No.: US 7,813,701 B2
(45) Date of Patent: Oct. 12, 2010

(54) INTERFERENCE OPTIMIZED OFDM

(75) Inventors: Peter N. Strong, Ipplepen (GB); Nigel King, South Brent (GB); Philip Bolt, Stoke Gabriel (GB)

(73) Assignee: Piping Hot Networks Limited, Ashburton (GB)

( * ) Notice: Subject to any disclaimer, the term of this patent is extended or adjusted under 35 U.S.C. 154(b) by 916 days.

(21) Appl. No.: 11/467,944

(22) Filed: Aug. 29, 2006

(65) Prior Publication Data

US 2008/0057869 A1 Mar. 6, 2008

(51) Int. Cl.
*H04B 15/00* (2006.01)

(52) U.S. Cl. .................. 455/63.1; 455/67.11; 455/500; 455/501; 455/114.2; 455/115.1

(58) Field of Classification Search ............... 455/67.11, 455/63.1
See application file for complete search history.

(56) References Cited

U.S. PATENT DOCUMENTS

| 6,934,340 B1 | 8/2005 | Dollard |
| 2003/0193889 A1 | 10/2003 | Jacobsen |

FOREIGN PATENT DOCUMENTS

| EP | 1261140 A | 11/2002 |
| WO | WO2006070551 A | 7/2006 |

OTHER PUBLICATIONS

L.Hanzo et al., OFDM and MC-CDMA for Broadband Multi-User Communications, WLANs and Broadcasting, 2003, p. 219-236.*
Ramjee Prasad, OFDM for Wireless Communications Systems, 2004, p. 11-16.*

* cited by examiner

*Primary Examiner*—Yuwen Pan
(74) *Attorney, Agent, or Firm*—Anthony P. Curtis

(57) ABSTRACT

A wireless broadband communications system that provides increased reliability in environments in which portions of the available operating frequency band are subject to interference. The system determines whether the operating frequency band is being subjected to interference. If so, then the system determines whether such interference is affecting one or more portions of the band. If interference is affecting just portions of the band, then the system reduces the data rate and the number of sub-carriers used to transmit data. Next, the system allocates the data to be transmitted to the sub-carriers currently being subjected to the lowest levels of interference, while allocating no data to the sub-carriers currently being subjected to the highest levels of interference. In this way, the system allocates the data to be transmitted to the sub-carriers occupying optimal portions of the operating frequency band, in response to detected changes in the interference environment.

21 Claims, 4 Drawing Sheets

INTERFERENCE OPTIMIZED OFDM

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates generally to wireless broadband communications systems, and more specifically to a system and method of providing time division duplex point-to-point radio links using orthogonal frequency division modulation that achieves increased reliability in environments in which portions of the available operating frequency band are subject to noise and/or interference.

Wireless broadband communications systems are known that employ orthogonal frequency division modulation (OFDM) to provide time division duplex (TDD) point-to-point radio links. Such wireless communications systems typically include at least one transmitter disposed at one end of a TDD point-to-point radio link, and at least one receiver disposed at the other end of the radio link. The transmitter may be configured to transmit data signals over one or more communications channels using specified error correction coding and modulation techniques. Further, the receiver may be configured to capture the transmitted data signals, and to employ specified signal processing techniques for decoding and demodulating the signals to recover the user data. In addition, such wireless communications systems typically employ adaptive modulation techniques to adjust various transmission parameters such as the coding rate and the modulation mode, thereby compensating for changes in channel characteristics that can adversely affect the quality and/or the rate of data transmission.

Wireless communications systems employing point-to-point radio links frequently operate in licensed frequency bands, which are generally allocated to assure that the systems are not adversely affected by interference caused by other systems operating in the same band or in different bands. For example, wireless communications systems operating in the same licensed band may be geographically separated from one another by distances sufficient to avoid interference from other systems operating in the same band. In addition, wireless communications systems in close proximity to one another may avoid interference by operating in different licensed bands. There are drawbacks, however, to operating wireless communications systems in licensed frequency bands. For example, users of such systems may be required to pay significant licensing fees to operate in the licensed bands. In addition, operating wireless communications systems in licensed frequency bands can sometimes result in inefficient use of the allocated frequency spectrum.

To avoid payment of high licensing fees, and to achieve more efficient use of the allocated spectrum, wireless communications systems may be configured to operate in shared frequency bands, such as the unlicensed frequency band for wireless LANs (WLANs) located at approximately 5.8 GHz. However, operating wireless communications systems in shared frequency bands also has drawbacks. For example, due to the unlicensed nature of the shared frequency band for WLANs located at 5.8 GHz, more than one WLAN operating in the shared band may be deployed within the same geographical area. Further, radar and/or other types of wireless communications systems, either operating in the same shared band or generating frequency harmonics having components in the shared band, may also be deployed within the same geographical area. As a result, wireless communications systems operating in shared frequency bands may be required to communicate over channels that are subject to increased levels of noise and/or interference, which can hinder the systems' ability to maintain high rates of data transmission.

Because wireless communications systems operating in shared frequency bands can be configured to follow specified frequency band plans and can employ specified bandwidths, the noise or interference generated by these systems may occupy just portions of the operating frequency bands available to other systems operating in the shared bands. As discussed above, wireless communications systems may employ adaptive modulation techniques to adjust the coding rate and modulation mode to provide the maximum payload consistent with reliable operation. However, adaptive modulation techniques typically adjust the coding rate and modulation mode based upon a measure of the received signal quality averaged over the entire operating frequency band. As a result, such systems may provide a reduced data rate, or may determine that a frequency band is unusable, even though noise or interference may be affecting only a portion of the operating frequency band.

It would therefore be desirable to have a wireless broadband communications system that provides increased reliability in environments in which portions of the available operating frequency band are subject to noise and/or interference, while avoiding the drawbacks of the above-described conventional systems.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Figure 1:
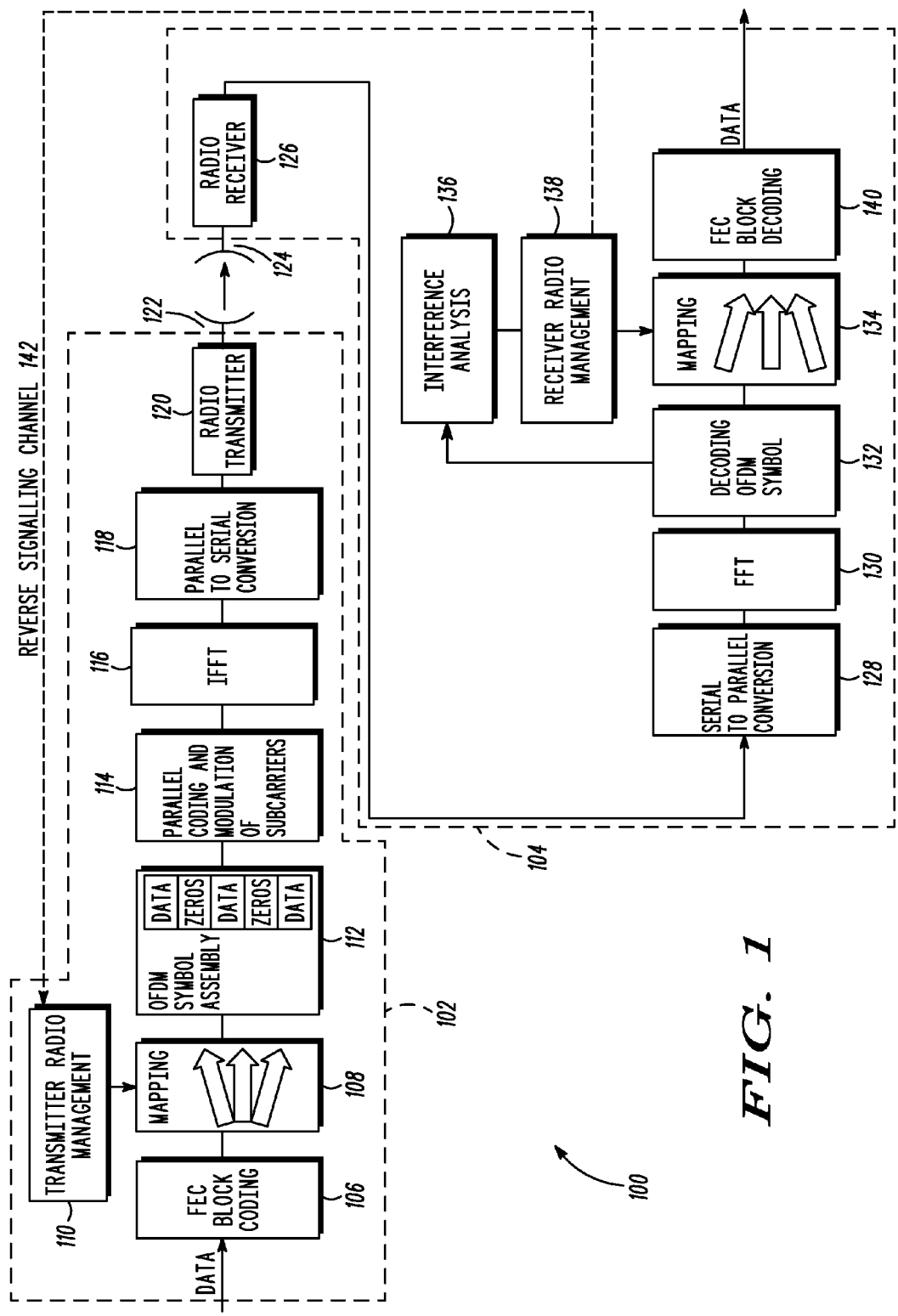
FIG. 1 is a block diagram of a wireless broadband communications system according to the present invention.

In accordance with the present invention, a wireless broadband communications system is provided that achieves increased reliability in environments in which portions of the available operating frequency band are subject to noise and/or interference. The presently disclosed wireless communications system employs a plurality of sub-carriers in an orthogonal frequency division modulation (OFDM) signal waveform to transmit data signals over one or more time division duplex (TDD) point-to-point radio links. In one mode of operation, the disclosed system determines whether the available operating frequency band is being subjected to interference based upon a measure of the average vector error over the entire operating frequency band. If the operating frequency band is being subjected to interference, then the disclosed system determines whether such interference is affecting one or more portions of the operating frequency band by measuring the vector error for each sub-carrier in the OFDM spectrum, and determining whether each vector error measurement exceeds a specified acceptable threshold. If interference is affecting just portions of the operating frequency band, then the disclosed system reduces both the data rate and the number of sub-carriers used to transmit the data signals.

In one embodiment, the reduced data rate and the reduced number of data-carrying sub-carriers are selected based upon the block sizes of data processed by the system per cycle in a block error correction coding/decoding technique. Next, the disclosed system allocates the data to be transmitted to the sub-carrier positions currently being subjected to the lowest levels of interference, while allocating no data to the sub-carrier positions currently being subjected to the highest levels of interference. The disclosed system then optimizes the data allocations by determining whether portions of the operating frequency band are still being affected by significant levels of interference. For example, the disclosed system may determine, for each sub-carrier in the OFDM spectrum, whether or not the vector error for that sub-carrier still exceeds the acceptable threshold. If interference is still affecting portions of the operating frequency band, then the data rate and the number of sub-carriers used to transmit data are further reduced, and the data allocations in the OFDM spectrum are repeated. For example, if the vector error for a respective sub-carrier still exceeds the acceptable threshold, then the disclosed system reallocates the data from that sub-carrier to an unused sub-carrier position having a lower associated vector error. In this way, in response to detected changes in the interference environment, the disclosed system allocates the data to be transmitted to the sub-carriers occupying optimal portions of the operating frequency band.

By identifying portions of the operating frequency band being subjected to the noise or interference, and allocating the data to be transmitted to the sub-carriers occupying those portions of the band experiencing the least interference, the presently disclosed wireless communications system achieves increased reliability in the presence of interference, while providing more efficient use of the allocated frequency spectrum.

A wireless broadband communications system is disclosed that provides increased reliability in environments in which portions of the available operating frequency band are subject to noise and/or interference. The presently disclosed wireless communications system identifies the portions of the operating frequency band currently being subjected to the noise or interference, and allocates the data to be transmitted to sub-carriers occupying those portions of the band currently experiencing the least interference, thereby providing increased reliability and more efficient use of the allocated frequency spectrum.

FIG. 1 depicts an illustrative embodiment of a wireless broadband communications system 100, in accordance with the present invention. The wireless communications system 100 includes a transmitter 102, a transmit antenna 122, a receiver 104, and a receive antenna 124. For example, the transmitter 102 and the transmit antenna 122 may be disposed at one end of a radio link, and the receiver 104 and the receive antenna 124 may be disposed at the other end of the radio link, which in the illustrated embodiment is a time division duplex (TDD) point-to-point radio link. The system 100 is configured to employ a plurality of sub-carriers in an orthogonal frequency division modulation (OFDM) waveform to transmit data signals over the TDD point-to-point radio link. It is noted that in a TDD system, at least one transmitter and at least one receiver are typically provided at each end of a radio link, thereby allowing the system to transmit and receive data signals alternately at each end of the link. FIG. 1 depicts the transmitter 102 disposed at one end of the radio link, and the receiver 104 disposed at the other end of the link, for clarity of illustration. It should be appreciated that the wireless communications system 100 may be employed in point-to-point or point-to-multipoint applications.

As shown in FIG. 1, the transmitter 102 includes a forward error correction (FEC) block coder 106, a mapper 108, a transmitter radio manager 110, an OFDM symbol assembler 112, an OFDM symbol parallel coder and modulator 114, an inverse fast Fourier transform (IFFT) processor 116, a parallel-to-serial converter 118, and a radio transmitter 120. Further, the receiver 104 includes a radio receiver 126, a serial-to-parallel converter 128, a fast Fourier transform (FFT) processor 130, an OFDM symbol decoder 132, a mapper 134, an interference analyzer 136, a receiver radio manager 138, and a FEC block decoder 140. It is noted that communication between the receiver radio manager 138 and the transmitter radio manager 110 can be achieved via a low bandwidth signaling channel 142, which may be carried within packet data headers in one or both directions over the radio link.

As described above, the transmitter 102 includes the FEC block coder 106, and the receiver 104 includes the FEC block decoder 140. At the transmitter 102, the FEC block coder 106 is configured to receive at least one block of input data having a specified block size, and to code the block of input data to form a block of output data having an increased number of bits. The FEC block coder 106 performs the coding operation so that a predetermined algorithm can be applied to the block of data at the receiver 104 to correct the data if less than a specified number of bits in the block are corrupted during data transmission and reception, as known in the art. In the presently disclosed embodiment, the FEC block decoder 140 operates on the same block sizes as the FEC block coder 106, thereby minimizing the cost and complexity of the decoder 140. Specifically, the transmission format of the block of data is arranged so that the transmitter 102 transmits the data in multiples of the block code length. The transmitter 102 transmits the data in bursts, and the capacity of the number of OFDM symbols in each transmit burst is a multiple of the output coding block size. As a result, the receiver 104 receives complete blocks of data for subsequent decoding by the FEC block decoder 140, obviating the need to store data between the transmit bursts.

In an exemplary mode of operation, the FEC block coder 106 receives each block of input data, and codes the block of data using any suitable error correcting code. The mapper 108 then receives the coded block of data, and maps the coded data to suitable sub-carriers. More specifically, under the control of the transmitter radio manager 110, the mapper 108 maps the data for subsequent modulation onto the sub-carriers corresponding to those portions of the operating frequency band currently being subjected to the least interference. It is noted that unused sub-carriers may be modulated at nominally zero amplitude or at any other suitable reduced amplitude. Further, the sub-carrier positions in the OFDM spectrum that are near the upper and lower edges of the operating frequency band may be modulated at nominally zero amplitude, or at any other suitable reduced amplitude, to obtain the shaping of the frequency spectrum required by federal regulations. In the presently disclosed embodiment, the mapper 108 does not map any data onto the sub-carriers corresponding to those portions of the operating frequency band currently experiencing the most interference. Like the unused sub-carriers and the sub-carriers near the upper and lower edges of the operating frequency band, the sub-carriers currently being affected by significant levels of interference may be modulated at nominally zero amplitude or at any other suitable reduced amplitude.

The mapper 108 provides the mapped data to the OFDM symbol assembler 112, which assembles the corresponding OFDM symbols. Next, the parallel coder and modulator 114 codes and modulates the OFDM symbols, and provides the coded and modulated symbols to the IFFT processor 116, which may have a fixed size and may provide a fixed number of potential sub-carrier positions. The IFFT processor 116 then provides the transformed symbols to the parallel-to-serial converter 118. In this way, the OFDM symbols are transformed to time domain samples, which are modulated onto a radio frequency (RF) carrier and transmitted in bursts by the radio transmitter 120 and the transmit antenna 122.

Upon reception at the receive antenna 124, the bursts of data are sampled in the time domain by the radio receiver 126, which provides the sampled data to the serial-to-parallel converter 128. Next, the serial-to-parallel converter 128 provides the data in parallel form to the FFT processor 130, which reconstructs the sub-carriers constituting each OFDM symbol in amplitude and phase. The OFDM symbol decoder 140 then decodes the OFDM symbols to data. To facilitate the decoding of the OFDM symbols, a subset of the sub-carriers are employed as pilot tones. Specifically, the transmitter 102 transmits the pilot tones with a predetermined amplitude and phase so that a channel equalization table can be generated by interpolation, as known in the art. The OFDM symbol decoder 140 then compares the amplitude and phase information for the OFDM symbols to the information contained in the channel equalization table to decode the OFDM symbols.

Next, the interference analyzer 136 in conjunction with the receiver radio manager 138 determine which data correspond to valid sub-carrier positions, i.e., the sub-carrier positions corresponding to those portions of the operating frequency band currently experiencing the least interference. In the presently disclosed embodiment, the interference analyzer 136 is configured to maintain a measure of the vector error for each sub-carrier averaged over a period of time sufficient to indicate the suitability of that sub-carrier for carrying data. Those of ordinary skill in this art will appreciate that, for each sub-carrier, the vector error may be determined by taking the difference between the received signal vector for that sub-carrier and the estimated ideal value of the received signal vector derived from error-corrected data. It is noted that the vector error can be averaged over time and/or over a number of sub-carriers to provide a measure of received signal quality. For the unused sub-carrier positions in the OFDM spectrum, the vector error may be calculated based upon the expectation that the amplitude of the received signal corresponding to these positions will be zero. The interference analyzer 136 is also configured to maintain a record of the interference level averaged over the entire operating frequency band based upon the power received in predetermined gaps in the transmission sequence, which is generally known as the channel availability check period.

To determine the presence of interference, the interference analyzer 136 may perform an analysis of the signals received during the channel availability check period, or may determine whether or not the vector error measurements for the sub-carriers exceed a specified acceptable threshold. In an alternative embodiment, the interference analyzer 136 may perform a selected one of these techniques, or a combination of these techniques, to determine the presence of interference. To determine whether the interference is affecting only a portion of the operating frequency band, the interference analyzer 136 may obtain a measure of the vector error for each of the sub-carriers in the OFDM spectrum. If the interference analyzer 136 determines that some of the sub-carriers in the OFDM spectrum have high levels of vector error while other ones of the sub-carriers have relatively low levels of vector error, then the receiver and transmitter radio managers 138, 110 operate to reduce the data rate and the number of sub-carriers used for carrying data. After the data rate and number of data-carrying sub-carriers are reduced, the transmitter 102 can allocate the input data to the sub-carriers corresponding to those portions of the operating frequency band that are currently being subjected to the least interference. The mapper 134 maps the data from these sub-carrier positions to the appropriate addresses in the FEC block decoder 140, which provides the error-corrected data at its output. It is noted that the sub-carriers corresponding to those portions of the operating frequency band currently experiencing the most interference are not used for carrying data.

In the presently disclosed embodiment, the data rate and the number of data-carrying sub-carriers are selected from values that are consistent with the block sizes of data to be processed per cycle by the FEC block decoder 140. In this way, incoming data in parallel form can be allocated to the sub-carriers least affected by interference via a re-allocation of addressing, obviating the need to store data for allocation to the next available transmission burst. For example, in one embodiment, the wireless communications system 100 may be configured to perform block coding efficiently with OFDM signals occupying frequency bandwidths of nominally 10 MHz, 20 MHz, or 30 MHz. In this case, if the operating frequency band were 30 MHz and the interference environment called for a reduction in the data rate and the number of data-carrying sub-carriers, then the data rate and the number of sub-carriers may be reduced to levels that would normally be used in either the 20 MHz or 10 MHz bandwidth mode.

Figure 2A:
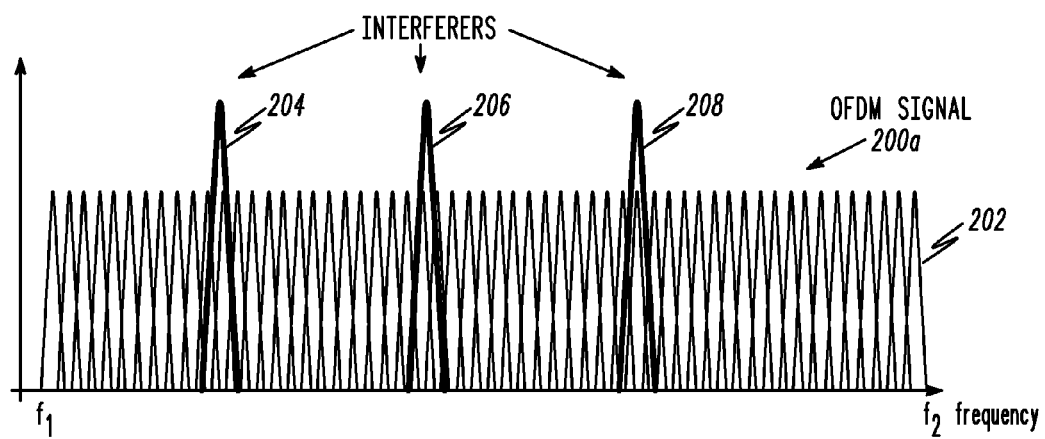
FIG. 2a is a diagram of an OFDM signal waveform, in which a plurality of sub-carriers fully occupy an available operating frequency band, and in which portions of the operating frequency band are being subjected to interference.

The processes performed by the receiver and transmitter radio managers 138, 110 to reduce the data rate and to optimize the number and positions of the data-carrying sub-carriers within the OFDM spectrum will be better understood with reference to the following illustrative example and FIGS. 2a-2d. FIG. 2a depicts an OFDM signal waveform 200a including a plurality of sub-carriers 202 fully occupying the available operating frequency band. As shown in FIG. 2a, the plurality of sub-carriers 202 overlap to cover the operating frequency band with a continuous spectrum of power between specified cut-off frequencies $f_1$ and $f_2$. The average power spectral density resulting from the composite signal formed by the superposition of the sub-carriers 202 is approximately uniform across the operating frequency band, with a roll-off toward the edges of the band for minimizing interference with adjacent operating channels.

As further shown in FIG. 2a, a plurality of interfering signals 204, 206, 208 is present within the operating frequency band. For example, the wireless communications system may be operating within an unlicensed frequency band such as the unlicensed band for wireless LANs (WLANs)

located at approximately 5.8 GHz, and the interfering signals 204, 206, 208 may be caused by transmissions from other systems operating within the same unlicensed band. It is noted that the interfering signals 204, 206, 208 may be at various levels relative to the OFDM signal 200*a*, and may have various center frequencies and/or bandwidths within the operating frequency band. In the illustrated embodiment, the interfering signals 204, 206, 208 are at levels higher than that of the OFDM signal 200*a*. As a result, the sub-carriers close to the frequencies occupied by the interfering signals 204, 206, 208 are likely to become corrupted. It should be appreciated that even when the interfering signals 204, 206, 208 are at the same level or at levels lower than that of the OFDM signal 200*a*, the signal-to-interference-plus-noise ratio may still be sufficient to cause some corruption of the sub-carriers near the interferers 204, 206, 208, thereby making the data-carrying capability of these sub-carriers unreliable.

Figure 2B:
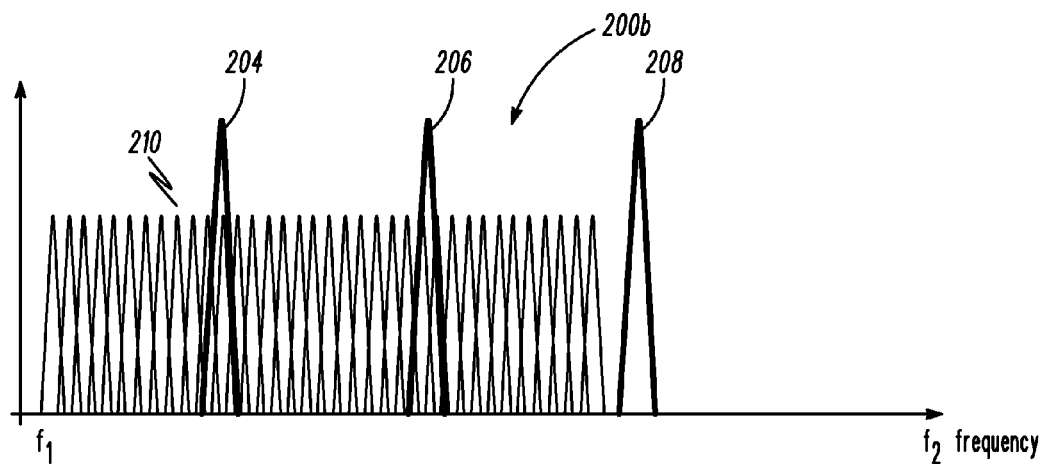
FIG. 2b is a diagram of the OFDM signal of FIG. 2a, in which the data rate and the number of data-carrying sub-carriers are reduced.

As described above, in the presence of interference, the receiver and transmitter radio managers 138, 110 (see FIG. 1) operate to reduce the data rate and the number of sub-carriers used for carrying data. Further, each of the data-carrying sub-carriers is analyzed for possible reallocation of its position within the OFDM spectrum based upon whether or not the vector error associated with the sub-carrier exceeds a specified acceptable threshold. FIG. 2*b* depicts an OFDM signal waveform 200*b*, which corresponds to the OFDM signal 200*a* (see FIG. 2*a*) after the data rate and the number of data-carrying sub-carriers are reduced. As shown in FIG. 2*b*, the sub-carriers near the interferer 204, e.g., the sub-carrier 210, may become corrupted due to their proximity to the interfering signal 204. For example, the vector error associated with the sub-carrier 210 may exceed the acceptable threshold due to its proximity to the interfering signal 204. Similarly, sub-carriers near the interferer 206 may become corrupted due to their proximity to the interfering signal 206. In this example, following the reduction of the data rate and the number of data-carrying sub-carriers, none of the sub-carriers are close enough to the interferer 208 to become corrupted due to their proximity to that interfering signal.

Figure 2C:
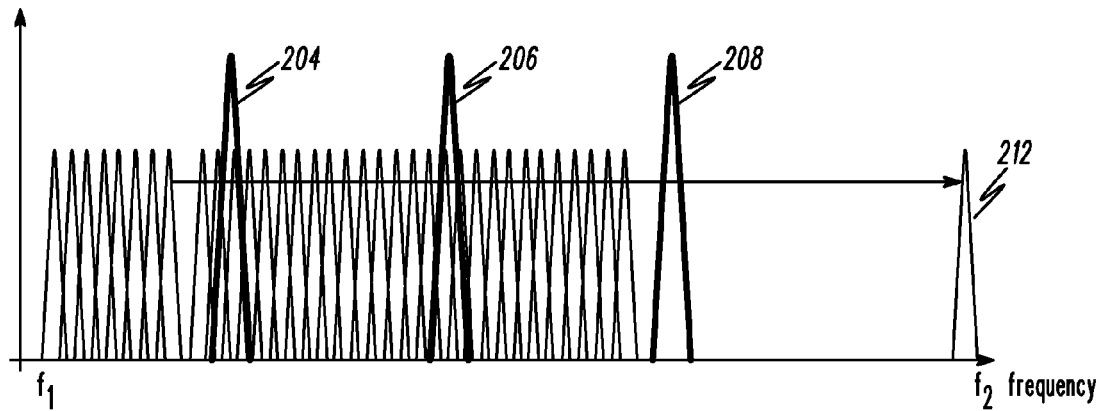
FIG. 2c is a diagram of the OFDM signal of FIG. 2b, in which a data-carrying sub-carrier is allocated to a portion of the operating frequency band experiencing a reduced level of interference.

If the vector error associated with the sub-carrier 210 exceeds the acceptable threshold, then the data for that sub-carrier is allocated to a sub-carrier position having an associated vector error that is less than that of the current sub-carrier position. FIG. 2*c* depicts an exemplary allocation of the data for the sub-carrier 210 to the position within the operating frequency band corresponding to a sub-carrier 212, which is far enough away from the frequencies of the interferers 204, 206, 208 to avoid being corrupted by these interfering signals. It should be appreciated that the data for each of the sub-carriers in close proximity to the interfering signals 204, 206, 208 may be similarly allocated to those portions of the operating frequency band currently experiencing less interference. As described above, the receiver and transmitter radio managers 138, 110 control the allocation of data within the OFDM spectrum via signaling over the low bit rate signaling channel 142 (see FIG. 1). In one embodiment, the measurement of the vector error and the allocation of data within the operating frequency band are performed for each of the data-carrying sub-carriers in sequence to reduce the demands on the data processing resources, and to assure that the low rate signaling channel 142 (see FIG. 1) between the receiver and transmitter radio managers 138, 110 can be employed.

Figure 2D:
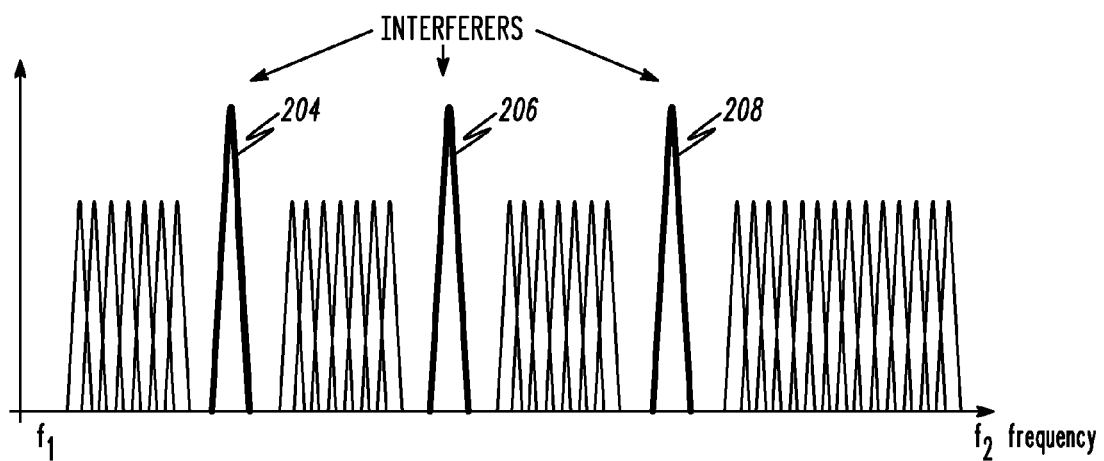
FIG. 2d is a diagram of the OFDM signal of FIG. 2c, in which all data-carrying sub-carriers are allocated to portions of the operating frequency band experiencing reduced levels of interference.

FIG. 2*d* depicts the resulting OFDM spectrum after the allocation of data among the sub-carrier positions within the operating frequency band is completed. As shown in FIG. 2*d*, the sub-carriers occupying the positions that are in close proximity to the interfering signals 204, 206, 208 are not used to transmit data, and are minimized in power. In one embodiment, following an initial allocation of data among the sub-carrier positions, the vector error for each sub-carrier is measured again to determine whether or not any of the sub-carriers are still being affected by significant levels of interference. If significant interference is still affecting some of the sub-carriers, then the data rate and the number of sub-carriers used to transmit the data are further reduced, and the allocation of the data within the OFDM spectrum is repeated. Such reallocation of the data among the sub-carrier positions may be repeated one or more times whenever the data rate and the number of data-carrying sub-carriers are reduced due to the presence of interference. In this way, in response to detected changes in the interference environment, the presently disclosed wireless communications system can change the positions of the data-carrying sub-carriers within the operating frequency band, thereby assuring that the data to be transmitted are allocated to sub-carriers occupying optimal portions of the band.

It should be appreciated that the sub-carrier positions corresponding to the pilot tones are not subject to the data allocation process described above. In the presently disclosed embodiment, the pilot tones occupy fixed positions in the OFDM spectrum. It is noted, however, that in situations where a pilot tone falls within a portion of the operating frequency band being affected by interference, the contribution of this pilot tone to the channel equalization table may be de-weighted based upon the vector error recorded for that pilot tone.

Figure 3:
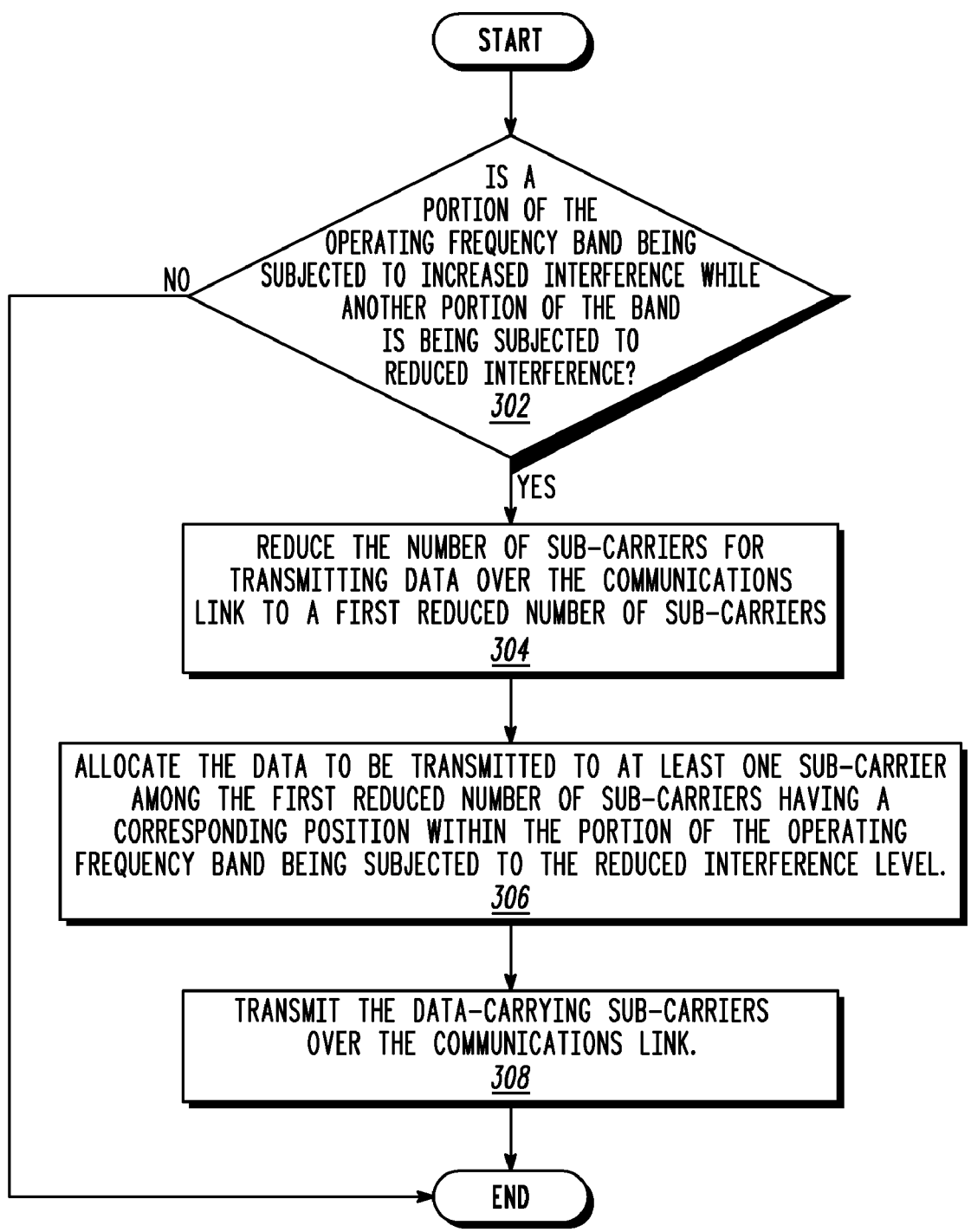
FIG. 3 is a flow diagram of a method of operating the wireless broadband communications system of FIG. 1.

An exemplary method of operating the presently disclosed wireless broadband communications system is described below with reference to FIG. 3. In this exemplary method, the wireless communications system employs a number of sub-carriers within an operating frequency band for transmitting data over at least one communications link. Further, each of the sub-carriers has a corresponding position within the operating frequency band. As depicted in step 302, a determination is made as to whether at least one portion of the operating frequency band is being subjected to an increased level of interference, while at least another portion of the operating frequency band is being subjected to a reduced level of interference. In the event at least one portion of the operating frequency band is being subjected to an increased interference level, while at least another portion of the operating frequency band is being subjected to a reduced interference level, the number of sub-carriers for transmitting data over the communications link is reduced to a first reduced number of sub-carriers, as depicted in step 304. In addition, the data to be transmitted is allocated to at least one sub-carrier among the first reduced number of sub-carriers having a corresponding position within the portion of the operating frequency band being subjected to the reduced interference level, as depicted in step 306. Finally, the data-carrying sub-carriers are transmitted over the communications link, as depicted in step 308. In the presently disclosed embodiment, the data-carrying sub-carriers are transmitted in an OFDM signal waveform over a TDD point-to-point radio link.

It should be appreciated that the functions necessary to implement the present invention may be embodied in whole or in part using hardware, software, firmware, or some combination thereof using micro-controllers, microprocessors, digital signal processors, programmable logic arrays, or any other suitable types of hardware, software, and/or firmware.

It will further be appreciated by those of ordinary skill in the art that modifications to and variations of the above-described system and method of providing interference optimized OFDM in wireless communications may be made without departing from the inventive concepts disclosed herein. Accordingly, the invention should not be viewed as limited except as by the scope and spirit of the appended claims.

What is claimed is:

1. A method of operating a wireless communications system, the method comprising the steps of:
   initially employing a first number of sub-carriers within an operating frequency band for transmitting data over at least one communications link, the first number of sub-carriers capable of being equal to or smaller than a second number of sub-carriers forming the operating frequency band;
   in a first determining step, determining whether at least one portion of the operating frequency band is being subjected to an increased level of interference, while at least one portion of the operating frequency band is being subjected to a reduced level of interference, the first determining step comprising measuring a vector error associated with each of the first number of sub-carriers and determining whether the vector error associated with each of the first number of sub-carriers exceeds a specified threshold; and
   in the event at least one portion of the operating frequency band is being subjected to an increased interference level while at least one portion of the operating frequency band is being subjected to a reduced interference level:
      in a first reducing step, reducing the number of sub-carriers for transmitting data over said communications link to a first reduced number of sub-carriers smaller than the first number of sub-carriers;
      in a first allocating step, allocating data to be transmitted to at least one sub-carrier among the first reduced number of sub-carriers, which have corresponding position only within the portion of the operating frequency band being subjected to the reduced interference level; and
      transmitting the at least one sub-carrier among the first reduced number of sub-carriers over said communications link.

2. The method of claim 1 further comprising:
   determining whether at least some of the first reduced number of sub-carriers are being subjected to an increased level of interference while at least some of the first reduced number of sub-carriers are being subjected to a reduced level of interference by measuring the vector error associated with each of the first reduced number of sub-carriers and determining whether the vector error associated with each sub-carrier of the first reduced number of sub-carriers exceeds the specified threshold; and
   in the event at least some of the first reduced number of sub-carriers are being subjected to an increased interference level while at least some of the first reduced number of sub-carriers are being subjected to a reduced interference level:
      in a second reducing step, reducing the first reduced number of sub-carriers to a second reduced number of sub-carriers; and
      in a second allocating step, allocating data to be transmitted to at least one sub-carrier among the second reduced number of sub-carriers having a corresponding position only within the first reduced number of sub-carriers being subjected to the reduced interference level.

3. The method of claim 1 wherein the sub-carriers contain pilot tones that are used to generate a channel equalization table by interpolation to facilitate decoding of the transmitted data and that are not subject to the first allocating step and, the method further comprises when at least one of the pilot tones falls within the at least one portion of the operating frequency band is being subjected to the increased interference level, the contribution of the at least one of the pilot tones to the channel equalization table is de-weighted based upon the vector error recorded for the at least one of the pilot tones.

4. The method of claim 1 wherein said first reducing step further comprises reducing a data rate for transmitting data over said communications link, wherein the reduction in the data rate in addition to, and separate from, reducing the number of sub-carriers.

5. The method of claim 4 further comprising selecting the data rate and the first number of sub-carriers so that a resulting data capacity of said system is a multiple of a predetermined data block size.

6. The method of claim 5 further comprising:
   coding, by an FEC block coder, data to be transmitted; and
   providing, by said FEC block coder, at least one block of coded data, wherein a size of the block of coded data corresponds to the predetermined data block size.

7. The method of claim 6 further comprising mapping the block of coded data onto the at least one sub-carrier among the first reduced number of sub-carriers having a corresponding position within the portion of the operating frequency band being subjected to the reduced interference level.

8. The method of claim 1 further comprising transmitting the first number of sub-carriers in an orthogonal frequency division modulation (OFDM) signal waveform over said communications link, said communications link comprising a time division duplex (TDD) point-to-point radio link.

9. The method of claim 1 wherein the wireless communications system is configured to perform block coding with signals occupying specified frequency bandwidths and, in the first allocating step, a data rate and a number of data-carrying sub-carriers into which the data is allocated are reduced to values that are consistent with block sizes of data to be processed per cycle by a block decoder, the data rate being reduced from that consistent with the operating frequency band to levels that would normally be used in an operating frequency band of lower bandwidth.

10. The method of claim 1 wherein measuring the vector error comprises maintaining a time-averaged measurement of vector error associated with each of the sub-carriers and determining whether the vector error associated with each of the sub-carriers exceeds the time-averaged measurement of vector error.

11. The method of claim 10 further comprising performing said measuring step and said step of determining whether the measured vector error associated with each of the sub-carriers exceeds the time-averaged measurement of vector error for each of the first number of sub-carriers taken in sequence.

12. A wireless communications system, comprising:
   at least one transmitter operative to transmit data using a plurality of sub-carriers in at least one orthogonal frequency division modulation (OFDM) signal waveform, the OFDM signal waveform being transmittable over at least one time division duplex (TDD) point-to-point radio link, each of the sub-carriers having a corresponding position within an operating frequency band; and
   at least one receiver operative to receive the OFDM signal comprising the plurality of sub-carriers,
   wherein said at least one receiver is further operative:
      to determine whether at least one portion of the operating frequency band is being subjected to an increased level of interference while at least one portion of the operating frequency band is being subjected to a reduced level of interference, to measure a vector error associated with each of the sub-carriers and determine whether the vector error associated with each of the sub-carriers exceeds a specified threshold; and in the event at least one portion of the operating frequency band is being subjected to an increased interference level while at least one portion of the operating frequency band is being subjected to a reduced interference level:

to transmit at least one control signal to said at least one transmitter over at least one signaling channel to reduce the number of sub-carriers for transmitting data over said link to a first reduced number of sub-carriers, the number of sub-carriers prior to the reduction capable of being equal to or smaller than the number of sub-carriers forming the operating frequency band, and to allocate data to be transmitted to at least one sub-carrier among the first reduced number of sub-carriers, which have a corresponding position only within the portion of the operating frequency band being subjected to the reduced interference level, the data being allocated among fewer sub-carriers than would have been used before the reduction to the first reduced number of sub-carriers.

13. The system of claim 12 wherein in the event at least some of the first reduced number of sub-carriers are being subjected to an increased interference level while at least some portion of the first reduced number of sub-carriers are being subjected to a reduced interference level, said at least one receiver is further operative to:

transmit at least one control signal to said at least one transmitter over said at least one signaling channel to reduce the first number of sub-carriers for transmitting data over said link to a second reduced number of sub-carriers; and allocate data to be transmitted to at least one sub-carrier among the second reduced number of sub-carriers having a corresponding position only within the first reduced number of sub-carriers being subjected to the reduced interference level, the data being allocated among fewer sub-carriers than would have been used after reducing the number of sub-carriers to the first reduced number of sub-carriers and before reducing the number of sub-carriers to the second reduced number of sub-carriers.

14. The system of claim 12 wherein:

the sub-carriers contain pilot tones that are used to generate a channel equalization table by interpolation to facilitate decoding of the transmitted data and that are not subject to the first allocating step data, and when at least one of the pilot tones falls within the at least one portion of the operating frequency band is being subjected to the increased interference level, the contribution of the at least one of the pilot tones to the channel equalization table is de-weighted based upon the vector error recorded for the at least one of the pilot tones.

15. The system of claim 12 wherein said at least one receiver is further operative to maintain a time-averaged measurement of vector error associated with each of the sub-carriers and determine whether the measured vector error associated with each of the sequence of sub-carriers exceeds the time-averaged measurement of vector error.

16. The system of claim 12 wherein in the event at least one portion of the operating frequency band is being subjected to an increased interference level while at least one portion of the operating frequency band is being subjected to a reduced interference level, said at least one receiver is further operative to transmit at least one control signal to said at least one transmitter over said at least one signaling channel to reduce a data rate for transmitting data over said link.

17. The system of claim 16 wherein said at least one transmitter is further operative to select the data rate and the first number of sub-carriers so that a resulting capacity of data transmission is a multiple of a predetermined data block size.

18. The system of claim 17 wherein said at least one transmitter comprises a forward error correction (FEC) block coder, wherein said FEC block coder is operative to code data to be transmitted by said at least one transmitter, and to provide at least one block of coded data, the at least one block of coded data having a size corresponding to the predetermined data block size.

19. The system of claim 18 wherein said at least one transmitter comprises a mapper operative to map the block of coded data onto the at least one sub-carrier among the first reduced number of sub-carriers having a corresponding position within the portion of the operating frequency band being subjected to the reduced interference level.

20. A wireless communications system comprising:

a transmitter operative to transmit data using a plurality of sub-carriers within an operating frequency band that has sub-carriers; and a receiver operative to:
receive the data,
measure a vector error associated with each of the sub-carriers,
determine whether the vector error associated with each of the sub-carriers exceeds a specified threshold and is thus being subjected to an unacceptable level of interference,
transmit a control signal to the transmitter if at least one of the sub-carriers is being subjected to the unacceptable amount of interference and the vector errors of other sub-carriers do not exceed the specified threshold and thus are being subjected to an acceptable level of interference, the control signal indicating that the transmitter is first to reduce the number of sub-carriers for transmitting the data and then to reallocate the data so that the data is to be transmitted only within sub-carriers whose vector errors do not exceed the specified threshold, and
following the reallocation of data, measure the vector error for each sub-carrier being used to transmit the data to again determine whether any of the sub-carriers transmitting the data are being subjected to the unacceptable amount of interference and if so transmit another control signal to the transmitter to further reduce the number of sub-carriers used to transmit the data and again reallocate the data within the sub-carriers whose vector errors do not exceed the specified threshold.

21. The system of claim 20 wherein:

the sub-carriers contain pilot tones that are used by the receiver to generate a channel equalization table to facilitate decoding of the transmitted data, the pilot tones occupy fixed positions in the operating frequency band and are thus not subject to reallocation, and when at least one of the pilot tones is being subjected to the unacceptable level of interference, the receiver is operative to de-weight the contribution of the at least one of the pilot tones to the channel equalization table based upon the vector error for the at least one of the pilot tones.

* * * * *